(12) United States Patent
Huang et al.

(10) Patent No.: US 8,253,094 B2
(45) Date of Patent: Aug. 28, 2012

(54) APERTURE UNIT CONTROLLED BY MAGNETIC FIELD AND A HEATER EMBEDED IN A CYLINDRICAL MEMBER AND IMAGING SYSTEM USING SAME

(75) Inventors: Yu-Chien Huang, Taipei Hsien (TW); Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 398 days.

(21) Appl. No.: 12/618,905

(22) Filed: Nov. 16, 2009

(65) Prior Publication Data
US 2010/0294920 A1    Nov. 25, 2010

(30) Foreign Application Priority Data
May 25, 2009    (CN) .......................... 2009 1 0302589

(51) Int. Cl.
*H01J 5/02*    (2006.01)
(52) U.S. Cl. ..................... 250/239; 250/201.4
(58) Field of Classification Search .................. 250/239, 250/216, 201.4, 227.11, 227.25, 229; 385/6, 385/16–25, 31, 125; 396/452–464
See application file for complete search history.

(56) References Cited

U.S. PATENT DOCUMENTS

| | | | | |
|---|---|---|---|---|
| 3,910,687 A | * | 10/1975 | Iwata | 359/228 |
| 4,384,761 A | * | 5/1983 | Brady et al. | 385/23 |
| 5,351,319 A | * | 9/1994 | Ginder et al. | 385/6 |

* cited by examiner

*Primary Examiner* — Que T Le
(74) *Attorney, Agent, or Firm* — Altis Law Group, Inc.

(57) ABSTRACT

An aperture unit includes a transparent cylindrical member, a magnetic fluid, and a magnetic field generator. The cylindrical member includes a cylindrical chamber. A light input end portion of the cylindrical member is transparent, and an opposite light output end portion of the cylindrical member is transparent. The magnetic fluid is received in the cylindrical chamber. The magnetic fluid includes a transparent solvent, a surfactant, and nano-magnetic particles dispersed substantially evenly in the solvent. Each of the magnetic nano-particles is enveloped by a surfactant. The magnetic field generator is positioned outside the cylindrical chamber. The magnetic field generator is configured for generating a magnetic field applied to the chamber and attracting and clustering the nano-particles, such that an annular nano-particle opaque layer is formed on an inner surface of the cylindrical member.

19 Claims, 5 Drawing Sheets

APERTURE UNIT CONTROLLED BY MAGNETIC FIELD AND A HEATER EMBEDED IN A CYLINDRICAL MEMBER AND IMAGING SYSTEM USING SAME

BACKGROUND

1. Technical Field

The present disclosure relates to optical imaging and, particularly, to an aperture unit and an imaging system using the aperture unit.

2. Description of Related Art

In imaging technologies, an aperture admits light into a system for a distinct period of time, to expose photographic film or a light-sensitive electronic sensor to the amount of light required to capture an image. As the value of the aperture increases, the amount of light admitted increases accordingly. Imaging systems often employ apertures of fixed value. This is inconvenient when the imaging system is applied in different environments.

Therefore, what is needed is an aperture unit and an imaging system using the same, which can overcome the limitations described.

BRIEF DESCRIPTION OF THE DRAWINGS

In the drawings, all the views are schematic.

DETAILED DESCRIPTION

Figure 1:
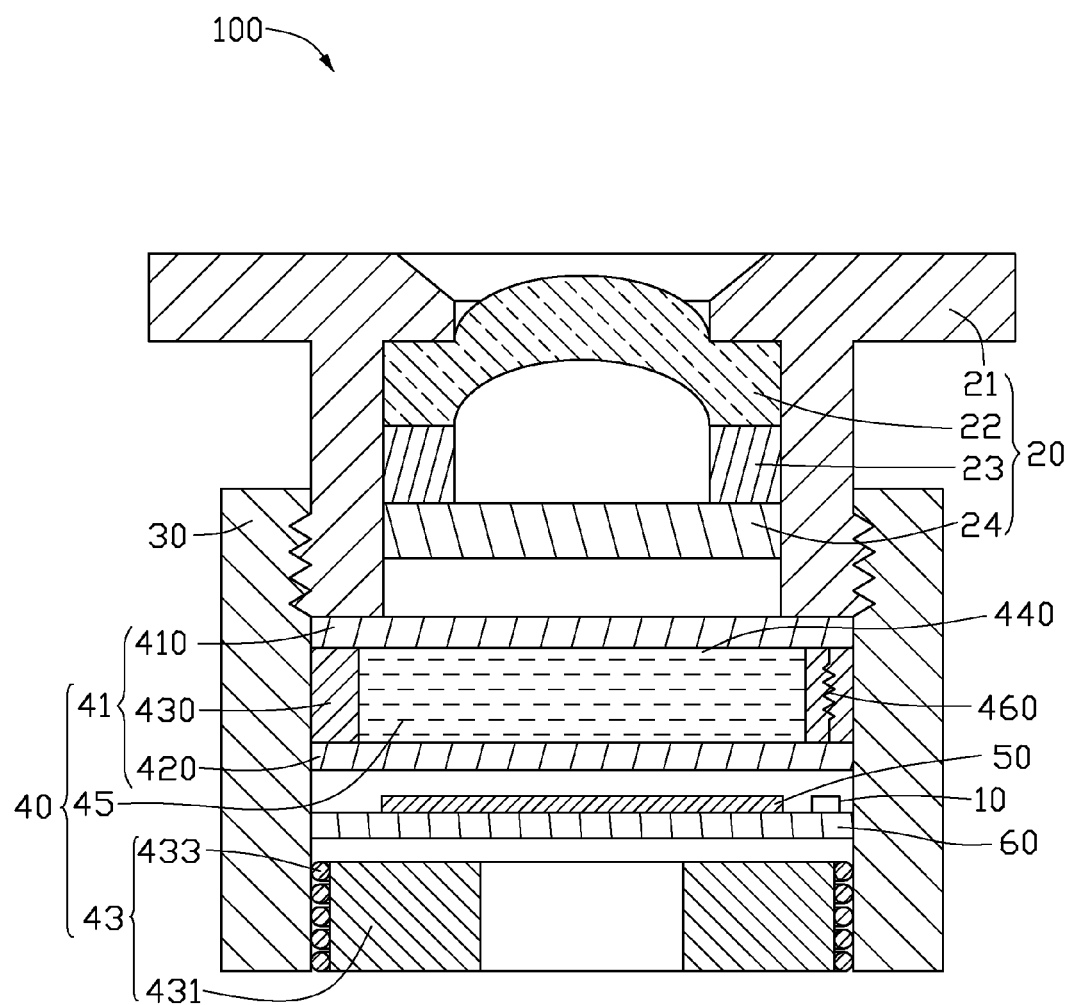
FIG. 1 is a cross-section of a first embodiment of an imaging system, according to the disclosure.

Referring to FIG. 1, a first embodiment of an imaging system 100 according to the disclosure includes a lens unit 20, a holder 30, an aperture unit 40, an image sensor 50, a control unit 10, and a circuit board 60. The aperture unit 40 and the image sensor 50 are arranged in the holder 30. The control unit 10 is electrically mounted on the circuit board 60.

The lens unit 20 includes a barrel 21, a lens 22, a spacer ring 23, and a filter 24. The lens 22, the spacer ring 23, and the filter 24 are arranged in the barrel 21 in that order from the object side to the image side of the lens unit 20. The barrel 21 is threadedly engaged with the holder 30.

The aperture unit 40 includes a cylindrical member 41, magnetic fluid 45, a heater 460 and a magnetic field generator 43. The cylindrical member 41 includes an upper plate 410, a lower plate 420 parallel to the upper plate 410, and a hollow cylinder 430. The hollow cylinder 430 connects the upper plate 410 to the lower plate 420 to cooperatively define a cylindrical chamber 440. The magnetic fluid 45 is received in the chamber 440. The heater 460 is embedded in the hollow cylinder 430, and operable to heat the magnetic fluid 45 in the chamber 440. The upper plate 410 and the lower plate 420 are transparent and the hollow cylinder 430 can be opaque. The cylindrical member 41 with the magnetic fluid 45 and the heater 460 is positioned between the lens unit 20 and the image sensor 50. The circuit board 60 is positioned between the image sensor 50 and the magnetic field generator 43.

Figure 2:
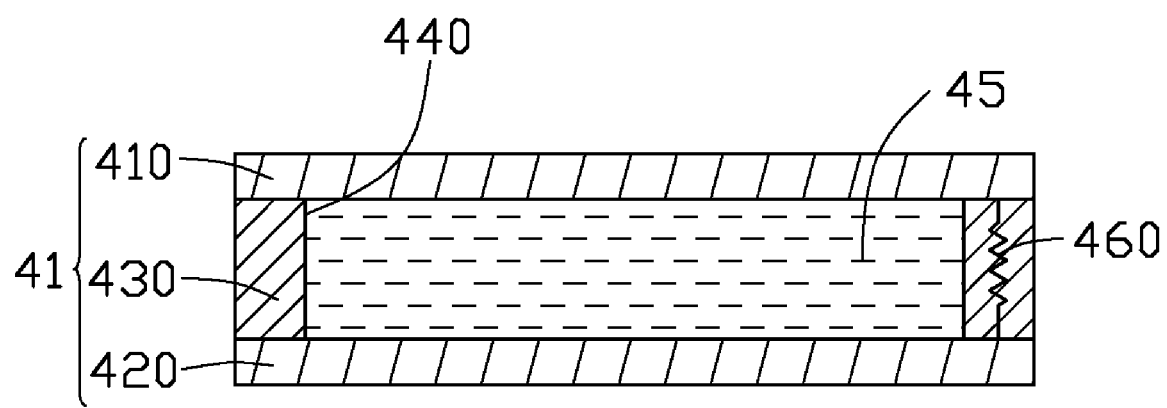
FIG. 2 is a view of a cylindrical member of an aperture unit of the imaging system shown in FIG. 1, showing the cylindrical member in a first state.
Figure 3:
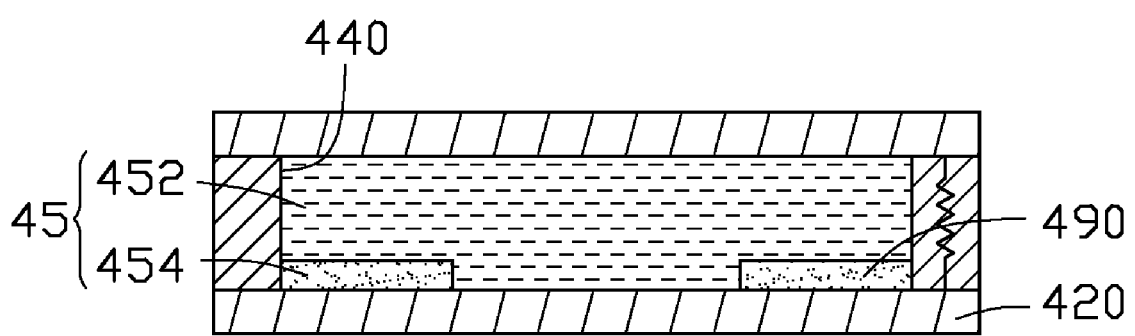
FIG. 3 is similar to FIG. 2, but showing the cylindrical member in a second state.

Further referring to FIG. 2 and FIG. 3, the magnetic fluid 45 includes a solvent 452, a plurality of magnetic nano-particles 454 dispersed therein, and a surfactant (not shown). The solvent 452 is transparent. The solvent 452 is water, alcohol, methanol, hexamethylene, or octane. The nano-particles 454 are small enough to permit transparency of the solvent 452 when evenly dispersed therein. In the present embodiment, the nano-particles 454 are ferrosoferric oxide nano-particles or manganese zinc ferrite nano-particles. Diameters of the nano-particles 454 are in the range from about 10 nanometers (nm) to about 100 nm. A weight percentage of the nano-particles 454 in the magnetic fluid 45 is in the range from about 1% to about 4%. Each of the nano-particles 454 is enveloped by the surfactant to allow even dispersal thereof in the solvent 452 when no magnetic field is applied. In FIGS. 1 and 2, the aperture unit 40 is shown in an initial (fully transmissive) state. The surfactant is polyvinyl alcohol, oleic acid, linoleic acid, or olive oil. Light passing through the lens unit 20, the upper plate 410, the magnetic fluid 45, and the lower plate 420 arrives at the image sensor 50 in this exemplary embodiment.

The heater 460 is a resistance heater in this exemplary embodiment. When the heater 460 is activated, it enhances the diffusion speed of the nano-particles 454 in the solvent 452. Accordingly, the transparent magnetic fluid 45 with the nano-particles 454 uniformly dispersed in the solvent 452 is quickly generated. The heater 460 is electrically connected to the circuit board 60 and the control unit 10 and activated by the control unit 10.

The image sensor 50 can be a charge-coupled device (CCD) or a complementary metal oxide semiconductor (CMOS) device, and is mounted on and electrically connected to the circuit board 60. In the present embodiment, the circuit board 60 is a printed circuit board.

The magnetic field generator 43 magnetizes the magnetic fluid 45. The magnetic field generator 43 includes an annular electromagnet 431 and a coil 433 wound therearound. The coil 433 is electrically connected to the circuit board 60 and the control unit 10 and activated by the control unit 10. A magnetic field is generated by the electromagnet 431 when the coil 433 is electrified, and the magnetic field is absent when the coil 433 is not electrified.

In operation of the imaging system 100, in an initial state, the nano-particles 454 are dispersed evenly in the solvent 452, as shown in FIGS. 1 and 2. The magnetic fluid 45 is, at this time, substantially fully transparent, and light passes through the lens unit 20, the upper plate 410, the magnetic fluid 45, and the lower plate 420 substantially unimpeded to arrive at the image sensor 50. At this time, the aperture unit 40 has a large value.

Referring to FIG. 3, in a second state, the coil 433 is electrified by the control unit 10, and the electromagnet 431 of the magnetic field generator 43 generates a magnetic field. The nano-particles 454 are attracted by the magnetic field to form an annular nano-particle layer 490 on an inner surface of the lower plate 420. As a result, light passing from the upper plate 410 is partially blocked by the nano-particle layer 490, and arrives at the image sensor 50. At this time, the aperture unit 40 has a small value.

Referring to FIG. 1 again, when the coil 433 is not electrified by the control unit 10, the magnetic field is absent, and the nano-particles 454 of the nano-particle layer 490 are substantially uniformly diffused in the solvent 452 by random diffusion. Further, the heater 460 is activated by the control unit 10 to speed the diffusion of the nano-particles 454 in the solvent 452. In summation, the imaging system 100 can controllably achieve two aperture values in the illustrated embodiment.

Furthermore, the imaging system 100 can achieve a desired variety of discrete aperture values by the control unit 10 appropriately controlling the strength of the magnetic field generated by the magnetic field generator 43.

Figure 4:
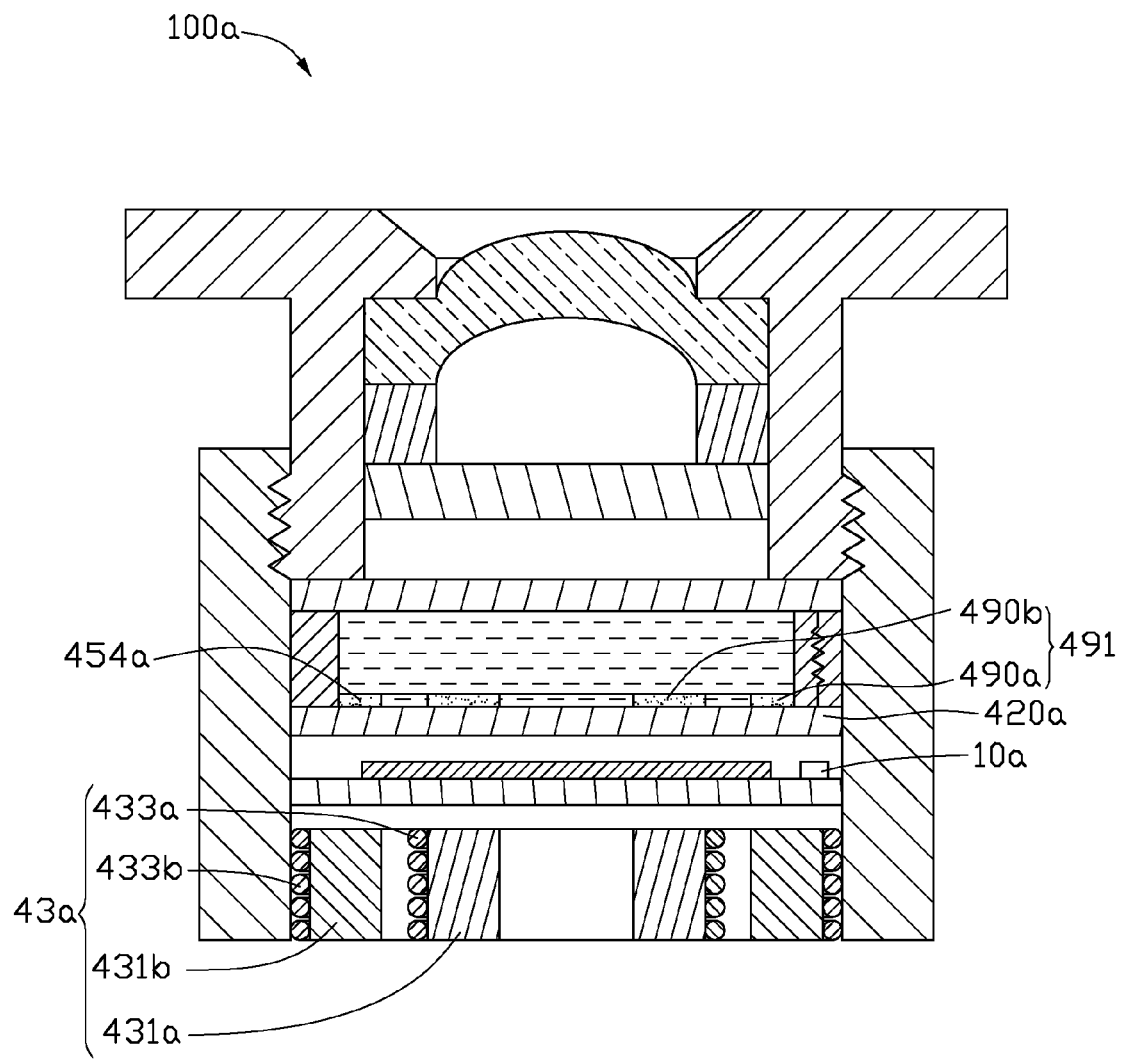
FIG. 4 is a cross-section of a second embodiment of an imaging system, according to the disclosure.

Referring to FIG. 4, a second embodiment of an imaging system 100a is shown. The imaging system 100a differs from the imaging system 100 basically only in the structure and arrangement of a magnetic field generator 43a thereof.

The magnetic field generator 43a includes a first annular electromagnet 431a, a first coil 433a wound around the first electromagnet 431a, a second annular electromagnet 431b, and a second coil 433b wound around the second electromagnet 431b. The first electromagnet 431a, the first coil 433a, the second electromagnet 431b and the second coil 433b are arranged coaxially.

When the first coil 433a and the second coil 433b are electrified by a control unit 10a, the first electromagnet 431a and the second electromagnet 431b generate a magnetic field. Accordingly, nano-particles 454a are attracted by the magnetic field, and a double annular nano-particle layer 491 is formed on an inner surface of a lower plate 420a. The double annular nano-particle layer 491 includes a first annular nano-particle layer 490a, and a second annular nano-particle layer 490b coaxially within the first annular nano-particle layer 490a.

Advantages of the imaging system 100a of the second exemplary embodiment are similar to those of the imaging system 100 of the first exemplary embodiment. Furthermore, the imaging system 100a can achieve a desired variety of discrete aperture values by the control unit 10a appropriately controlling the strength of the magnetic field generated by the magnetic field generator 43a. In particular, the strength of the magnetic field generated by the first electromagnet 431a can be controlled independently of the strength of the magnetic field generated by the second electromagnet 431b, or in unison with the strength of the magnetic field generated by the second electromagnet 431b, and vice versa. Thereby, a wide variety of formations of the double annular nano-particle layer 491 can be obtained.

Figure 5:
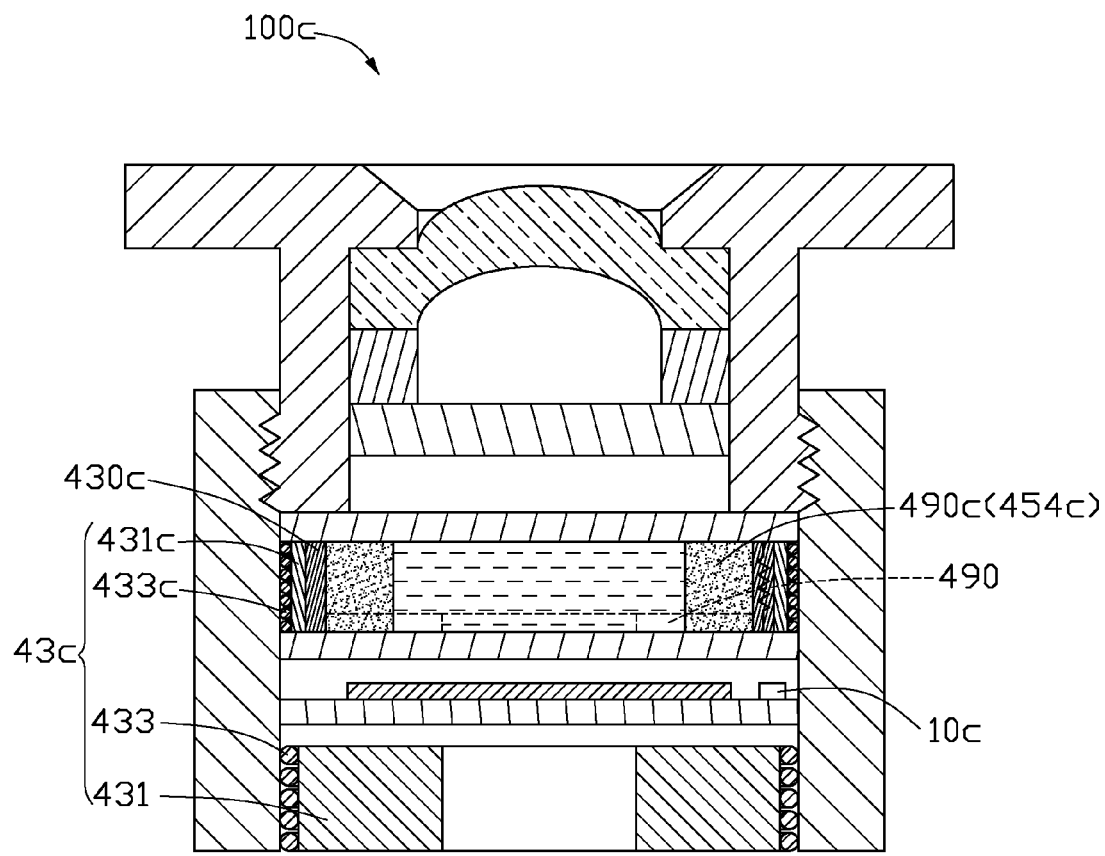
FIG. 5 is a cross-section of a third embodiment of an imaging system, according to the disclosure.

Referring to FIG. 5, a third embodiment of an imaging system 100c is shown. The imaging system 100c differs from the imaging system 100 basically only in that a magnetic field generator 43c further includes a second annular electromagnet 431c and a second coil 433c wound around the second electromagnet 431c coaxially. The second electromagnet 431c surrounds a hollow cylinder 430c. The second coil 433c is electrically connected to a control unit 10c. The control unit 10c is configured for electrifying the coil 433 and the second coil 433c.

When only the second coil 433c is electrified by the control unit 10c, the second electromagnet 431c of the magnetic field generator 43c generates a magnetic field to which nano-particles 454c are attracted. A second annular nano-particle layer 490c is formed accordingly on an inner surface of the hollow cylinder 430c. The inner diameter of the second annular nano-particle layer 490c is different from that of the annular nano-particle layer 490 formed only by the electromagnet 431. That is, the second annular nano-particle layer 490c is formed differently from the annular nano-particle layer 490, under control of the control unit 10c.

Advantages of the imaging system 100c of the third exemplary embodiment are similar to those of the imaging system 100 of the first exemplary embodiment. Furthermore, the imaging system 100c can achieve a desired variety of discrete aperture values by the control unit 10c appropriately controlling the strength of the magnetic field generated by the magnetic field generator 43c. In particular, the strength of the magnetic field generated by the electromagnet 431 can be controlled independently of the strength of the magnetic field generated by the second electromagnet 431c, or in unison with the strength of the magnetic field generated by the second electromagnet 431c, and vice versa. Thereby, a wide variety of formations ranging between the nano-particle layer 490 and the second annular nano-particle layer 490c can be obtained.

It is to be understood, however, that even though numerous characteristics and advantages have been described with reference to particular embodiments, the present invention is not limited to the particular embodiments described and exemplified, and the embodiments are capable of considerable variation and modification without departure from the scope and spirit of the appended claims.

What is claimed is:

1. An aperture unit, comprising:
a cylindrical member defining a cylindrical chamber therein, a light input end portion of the cylindrical member being transparent, and an opposite light output end portion of the cylindrical member being transparent;
a magnetic fluid received in the cylindrical chamber, the magnetic fluid comprising a transparent solvent, a surfactant, and a plurality of magnetic nano-particles dispersed in the solvent, each of the magnetic nano-particles enveloped by the surfactant;
a heater embedded in the cylindrical member for enhancing the diffusion speed of the nano-particles such that the nano-particles are dispersed in the solvent in an initial state; and
a magnetic field generator positioned on one side of the cylindrical chamber and configured for generating a magnetic field applied to the chamber and attracting and clustering the nano-particles such that an annular nano-particle opaque layer is formed on an inner surface of the cylindrical member in a second state.

2. The aperture unit of claim 1, wherein the cylindrical member comprises an upper plate, a lower plate parallel to the upper plate, and a hollow cylinder connecting the upper plate to the lower plate to cooperatively define the cylindrical chamber.

3. The aperture unit of claim 2, wherein the upper plate and the lower plate are transparent and the cylinder is opaque.

4. The aperture unit of claim 1, wherein the surfactant is selected from the group consisting of polyvinyl alcohol, oleic acid, linoleic acid, and olive oil.

5. The aperture unit of claim 1, wherein the nano-particles are selected from the group consisting of ferrosoferric oxide nano-particles and manganese zinc ferrite nano-particles.

6. The aperture unit of claim 1, wherein diameters of the nano-particles are in the range from about 10 nm to about 100 nm.

7. The aperture unit of claim 1, wherein a weight percentage of the nano particles in the magnetic fluid is in the range from about 1% to about 4%.

8. The aperture unit of claim 1, wherein the solvent is selected from the group consisting of water, alcohol, methanol, hexamethylene, and octane.

9. The aperture unit of claim 1, wherein the magnetic field generator comprises an annular electromagnet and a coil wound around the electromagnet.

10. The aperture unit of claim 9, wherein the magnetic field generator further comprises a second annular electromagnet, and a second coil wound around the second electromagnet, and the second electromagnet is embedded in the cylindrical member coaxially.

11. The aperture unit of claim 1, wherein the magnetic field generator comprises a first annular electromagnet, a first coil wound around the first electromagnet, a second annular electromagnet, and a second coil wound around the second electromagnet, and the second electromagnet is positioned in the first electromagnet coaxially.

12. An imaging system, comprising:
a holder;
a lens unit coupled with the holder;
at least one lens positioned in the lens unit;
an image sensor positioned in the holder; and
an aperture unit positioned in the holder, the aperture unit comprising:
 a cylindrical member positioned at a first side of the image sensor, the cylindrical member defining a cylindrical chamber therein, a light input end portion of the cylindrical member being transparent, and an opposite light output end portion of the cylindrical member being transparent;
 a magnetic fluid received in the cylindrical chamber, the magnetic fluid comprising a transparent solvent, a surfactant, and a plurality of magnetic nano-particles dispersed in the solvent, each of the magnetic nano-particles enveloped by the surfactant;
 a heater embedded in the cylindrical member for enhancing the diffusion speed of the nano-particles such that the nano-particles are dispersed in the solvent in an initial state; and
 a magnetic field generator positioned at an opposite second side of the image sensor, the magnetic field generator configured for generating a magnetic field applied to the chamber and attracting and clustering the nano-particles such that an annular nano-particle opaque layer is formed on an inner surface of the cylindrical member in a second state.

13. The imaging system of claim 12, wherein the cylindrical member comprises an upper plate, a lower plate parallel to the upper plate, and a hollow cylinder connecting the upper plate to the lower plate to cooperatively define the cylindrical chamber.

14. The imaging system of claim 13, wherein the upper plate and the lower plate are transparent and the cylinder is opaque.

15. The imaging system of claim 12, further comprising a control unit configured for activating the magnetic field generator to generate the magnetic field.

16. The imaging system of claim 15, further comprising a circuit board, wherein the image sensor and the control unit are electrically coupled on the circuit board.

17. The imaging system of claim 15, wherein the magnetic field generator comprises an annular electromagnet and a coil wound around the electromagnet, and the control unit is configured for electrifying the coil.

18. The imaging system of claim 17, wherein the magnetic field generator further comprises a second annular electromagnet, and a second coil wound around the second electromagnet, the second electromagnet is embedded in the cylindrical member coaxially, and the control unit is further configured for electrifying the second coil.

19. The imaging system of claim 15, wherein the magnetic field generator comprises a first annular electromagnet, a first coil wound around the first electromagnet, a second annular electromagnet, and a second coil wound around the second electromagnet, the second electromagnet is positioned in the first electromagnet coaxially, and the control unit is configured for electrifying the first coil and the second coil.

* * * * *